(12) United States Patent
Buchwitz et al.

(10) Patent No.: US 8,893,846 B2
(45) Date of Patent: Nov. 25, 2014

(54) POWER ASSISTED STEERING ASSEMBLY

(71) Applicant: Ford Global Technologies, LLC, Dearborn, MI (US)

(72) Inventors: Joe L. Buchwitz, Huntington Woods, MI (US); James A. Drozdowski, Canton, MI (US); Bradley G. Hochrein, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/766,302

(22) Filed: Feb. 13, 2013

(65) Prior Publication Data

US 2014/0224566 A1    Aug. 14, 2014

(51) Int. Cl.
*B62D 5/06* (2006.01)
*B62D 5/04* (2006.01)

(52) U.S. Cl.
CPC ........... *B62D 5/0424* (2013.01); *B62D 5/04* (2013.01)
USPC .. 180/428; 436/148; 280/93.515; 280/93.514

(58) Field of Classification Search
CPC .................................................... B62D 5/0424
USPC ......... 180/402, 412, 427, 428, 443, 444, 446; 701/41, 42; 280/124.109, 785
See application file for complete search history.

(56) References Cited

U.S. PATENT DOCUMENTS

| | | | |
|---|---|---|---|
| 3,527,316 A * | 9/1970 | Jones, Jr. et al. | 180/437 |
| 5,040,629 A * | 8/1991 | Matsuoka et al. | 180/446 |
| 6,354,396 B1 | 3/2002 | Horton et al. | |
| 6,644,432 B1 | 11/2003 | Yost et al. | |
| 6,702,060 B2 | 3/2004 | Tatewaki et al. | |
| 7,077,234 B2 * | 7/2006 | Klais et al. | 180/428 |
| 8,055,409 B2 | 11/2011 | Tsuchiya | |
| 2003/0051938 A1 * | 3/2003 | Menjak et al. | 180/444 |
| 2010/0264609 A1 * | 10/2010 | Schmidt et al. | 280/5.51 |

FOREIGN PATENT DOCUMENTS

| | | |
|---|---|---|
| CN | 101450677 A | 6/2009 |
| CN | 101700786 A | 5/2010 |

OTHER PUBLICATIONS

Bruce W. Smith, Still the King, (http://www.gulfcoastnews.com/RT2005FordF250.htm).
Mike Levine, Driving a Pickup with Electric Power Steering, May 31, 2010, (http://news.pickuptrucks.com/2010/05/driving-a-pickup-with-electric-power-steering.html).

* cited by examiner

*Primary Examiner* — Joseph M Rocca
*Assistant Examiner* — Jacob Knutson
(74) *Attorney, Agent, or Firm* — Raymond L. Coppiellie; Bejin Bieneman PLC (57) ABSTRACT

A wheeled vehicle includes a solid vehicle frame and a solid front axle including wheels movable to change the direction of the vehicle, a steering assembly including a steering wheel, a steering shaft coupled with the steering wheel, and a rotary output member having an end selectively movable in response to an input to the steering wheel, the solid front axle vehicle includes an electric power assist steering (EPAS) system for selectively steering the vehicle separately from any input to the steering wheel. The EPAS system includes a motor having a rotary output coupled to a steering gear and a steering rack having a longitudinal extent defining an axis having an end coupled a tie rod of the steering assembly. The longitudinal axis of the EPAS assembly is aligned with or transverse to the forward vehicle direction so its output is coupled to the output of the steering wheel and can be actuated independently.

9 Claims, 11 Drawing Sheets

POWER ASSISTED STEERING ASSEMBLY

BACKGROUND

It is generally known to provide a vehicle with a steering mechanism. It is generally known to provide a vehicle, such as a passenger vehicle, with a steering assembly that is operated by a steering wheel. For quite some time it has also been generally known to provide a vehicle with power assisted steering as well as electric power assisted steering. However, such electric power assisted steering (EPAS) have been limited to column-based systems for relatively small vehicles and relatively lowly rated front gross axle weights. Further, such generally known EPAS systems are only implemented in rack and pinion type steering architectures where an electric motor is directly driving a pinion on the gear rack. One known alternative to the above is a column-mounted EPAS where an electric motor directly drives the I-shaft or steering column. The column-mounted EPAS is a relatively very expensive solution, particularly in a vehicle architecture including a solid front axle and cab on frame design.

However, despite such power assisted steering system assemblies being known for quite some time, none have been successfully integrated into vehicles having a solid (or monobeam) front axle. In particular, the generally known power assisted steering system assemblies have not been successfully integrated into a vehicle having a significant gross axle weight rating (GAWR) being steered, such as a heavy duty pickup having a cab on frame architecture and including a solid front axle, because such generally known mechanisms are not currently commercially available and capable of proper operation in such applications. Accordingly, their long remains a significant need to develop an electronically controlled, power assisted steering system that can be used in a vehicle having a solid front axle and having a significant gross vehicle weight over the wheels being steered.

DETAILED DESCRIPTION

Referring in general to all of the Figures and in particular to FIGS. 1 through 9, an exemplary embodiment of an electronic power assist steering assembly according to the present disclosure and teachings is provided for a vehicle having a solid front axle capable of supporting a relatively significant front gross axle weight rating (GAWR). One such exemplary vehicle is, but is not limited to, a pickup truck, such as a heavy duty pickup truck. Typically, some pickup trucks have a front GAWR of greater than approximately 3000 pounds. It is possible for such vehicles to have a maximum front GAWR in the range of between approximately 5000 pounds and approximately 7000 pounds. Further, it is known that the maximum front GAWR for such vehicles can be as high as approximately 10,000 pounds or more.

Typically, such a vehicle may include a vehicle frame 10 having any generally known or appropriate construction. In particular the vehicle frame 10 includes right-hand and left-hand beams as is generally known for a cab on frame vehicle. The vehicle frame 10 may include a front axle 11 coupled to the vehicle frame 10 in any known or appropriate manner. The front axle 11 may be a solid or monobeam member and may include a differential 12. The front axle 11 is preferably supported on the left-hand and right-hand sides by wheels as is generally known. Front axle 11 may include other known and appropriate left hand and or right hand functioning components such as steering knuckles, bushings, bearings, rotors and brake mechanisms as are all generally known. Further, the vehicle may include a steering assembly 20 including a steering wheel 21 coupled indirectly to rotate a first end 22 of an I-shaft or steering column 23. The I-shaft 23 may be of a general or appropriate construction and may have a second or opposite end 24 coupled to rotate an input 25 to a recirculating ball nut mechanism 50. The steering wheel 21 may be of any generally known or appropriate type and may include other devices and mechanisms as may be desired and/or appropriate.

The recirculating ball nut mechanism 50 may be of a general or appropriate construction and may include an output or link member 55 that rotates between at least a first position in which the wheels are turned all the way to the left and a second position in which the wheels are turned all the way to the right. The ball nut mechanism 50 may include an electric motor coupled to a gear train for rotating within the mechanism 50. The ball nut may be coupled to the output 50 disposed through the ball nut on the axis thereof such that rotation of the ball nut may cause the rack shaft to move axially (or translate) with respect to the housing of the ball nut mechanism 50. The ratio of turns of the steering wheel 21 to the rotation angle of the output member 55 is consistent with traditional steering mechanisms of the type. Traditionally, the known steering assemblies in such a vehicle would include a hydraulic power assist system (HPAS) which is unexpectedly absent in the vehicle of the present disclosure.

Figure 1:
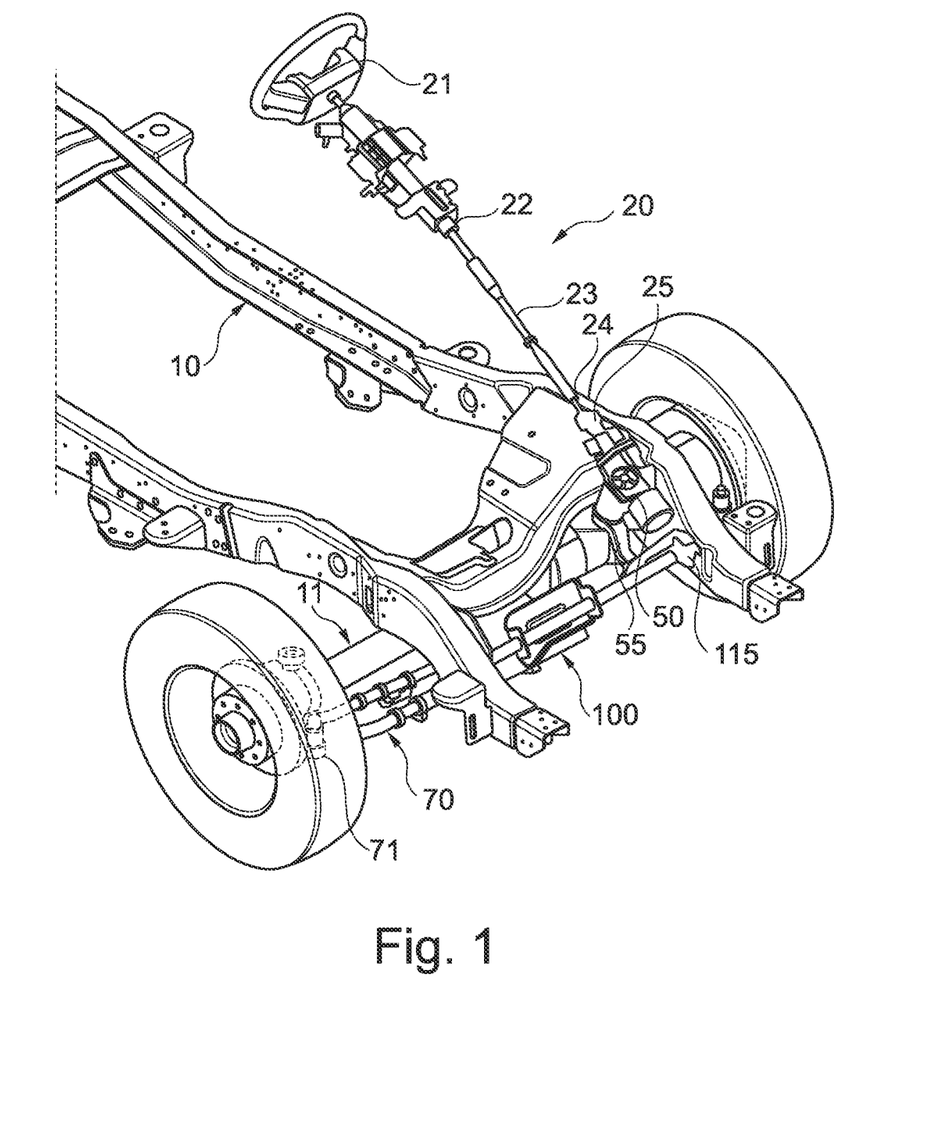
FIG. 1 is a perspective graphic view of a vehicle frame having a solid front axle and including a power assist steering apparatus according to an exemplary embodiment of the present disclosure.
Figure 2:
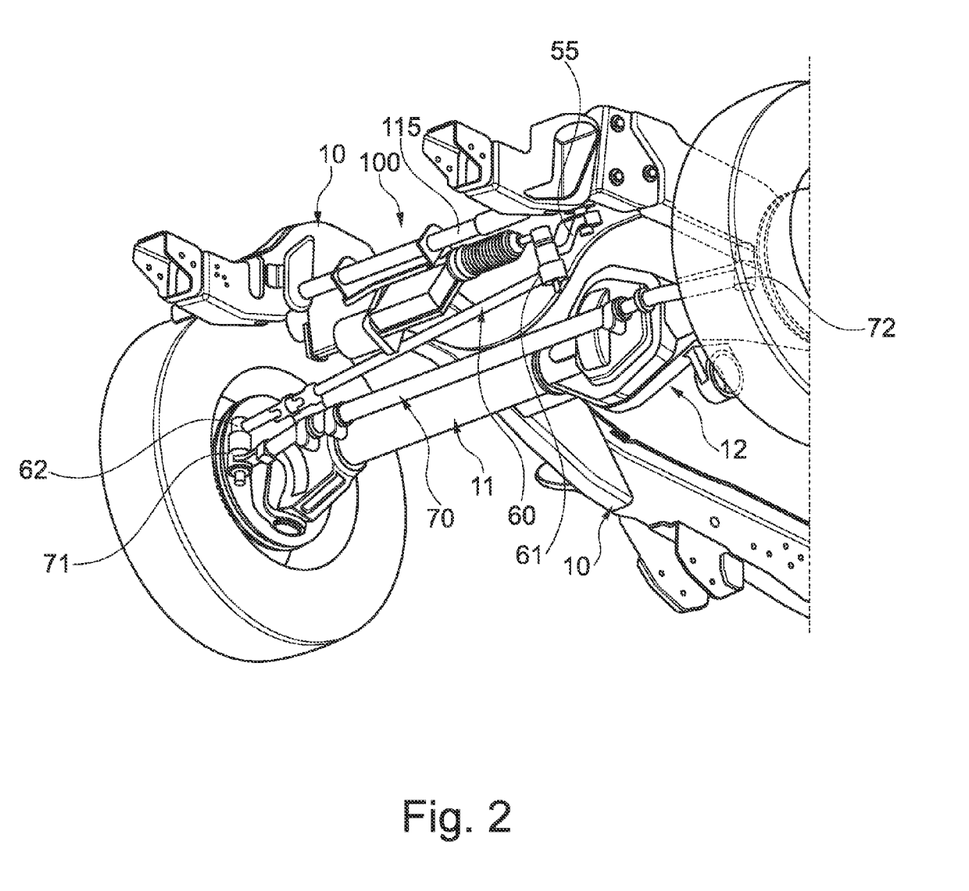
FIG. 2 is an alternate perspective graphic view of the exemplary embodiment of FIG. 1.
Figure 3:
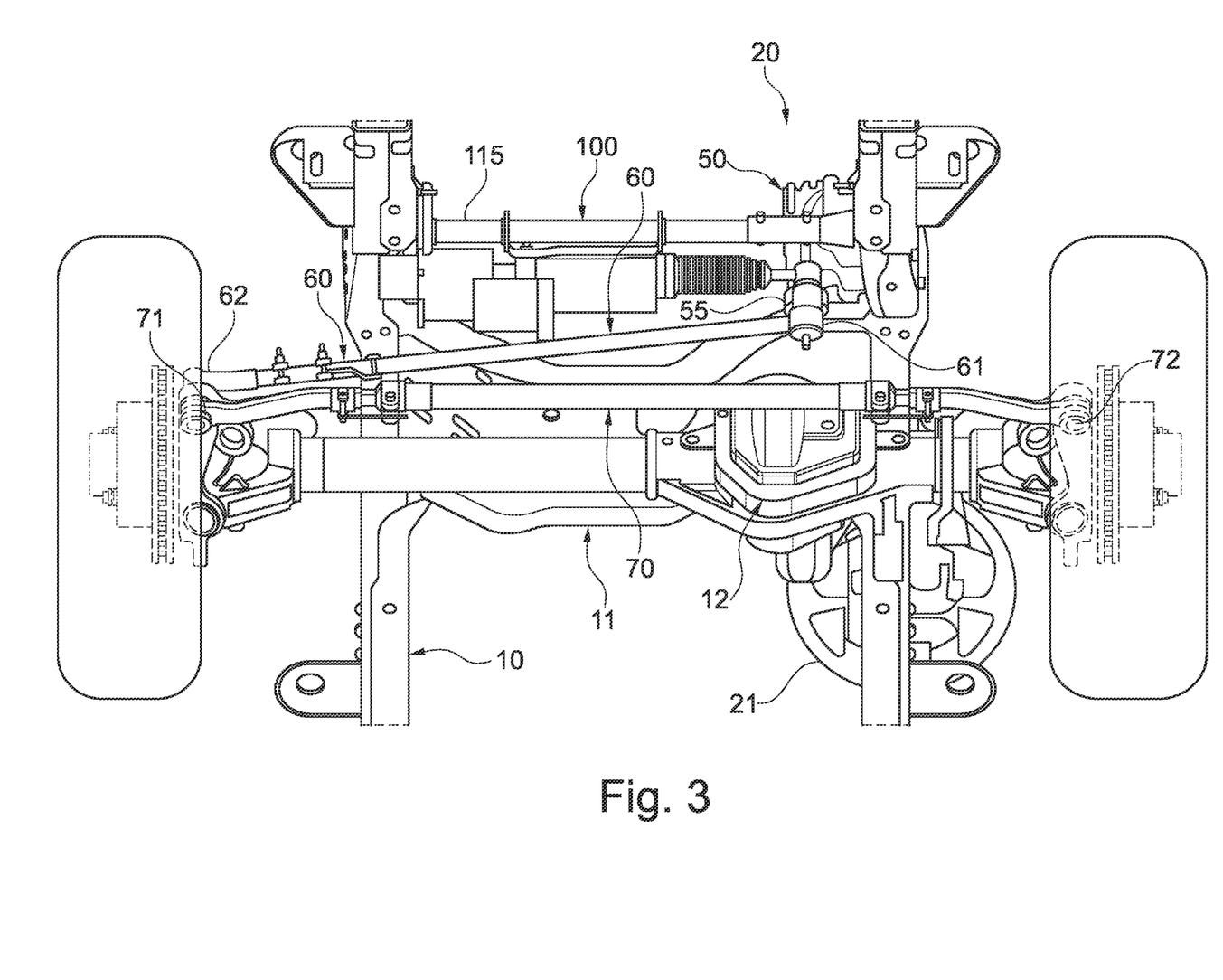
FIG. 3 is a bottom graphic view of the exemplary embodiment of FIG. 1.
Figure 4:
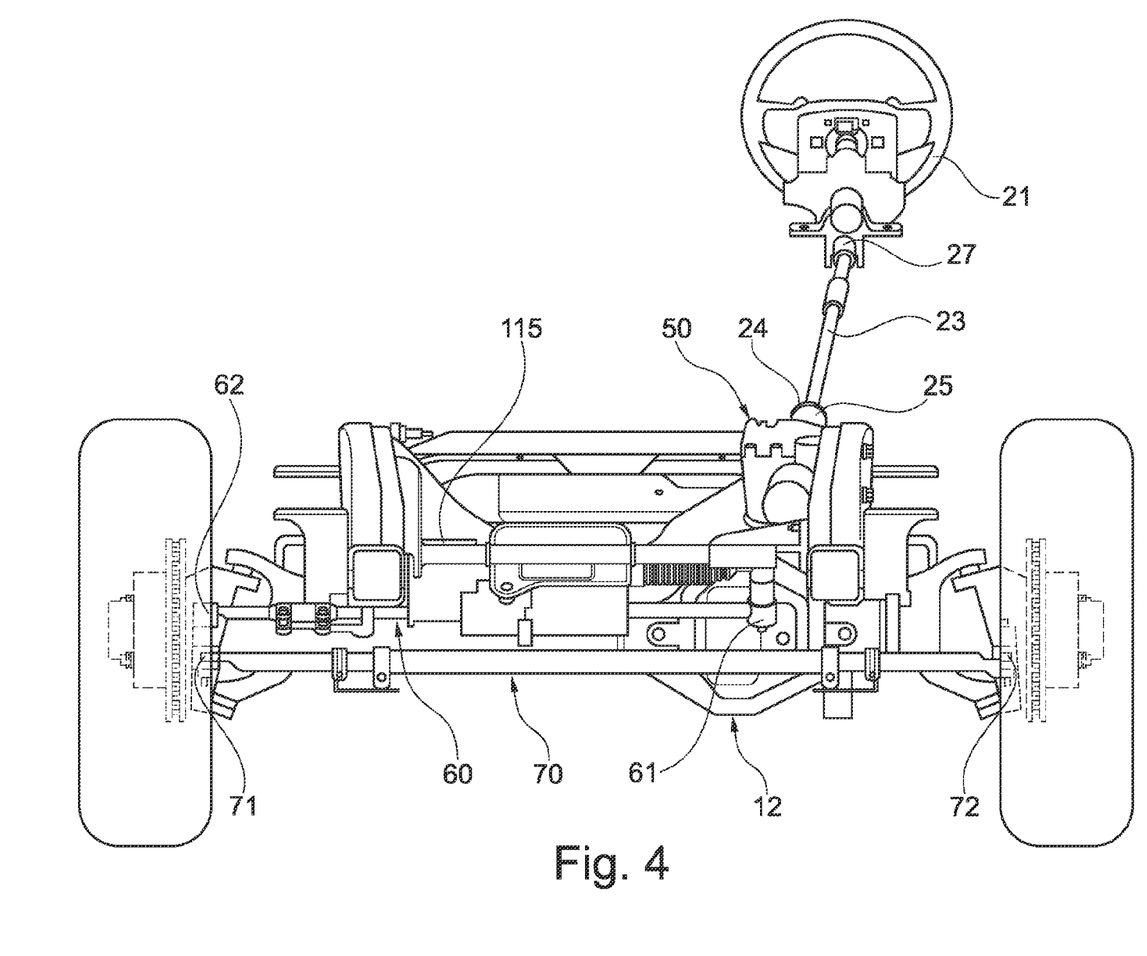
FIG. 4 is a front plan graphic view of the exemplary embodiment of FIG. 1.
Figure 5:
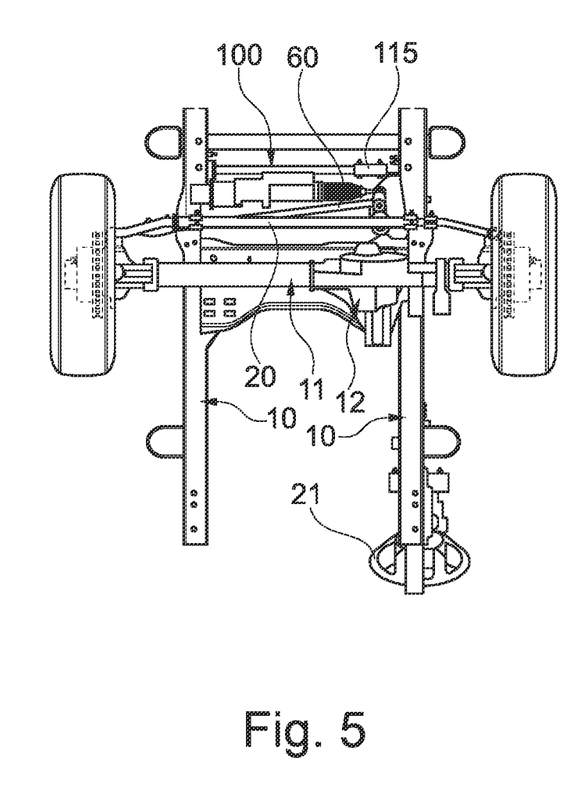
FIG. 5 is a bottom plan graphic view of the exemplary embodiment of FIG. 1.
Figure 6:
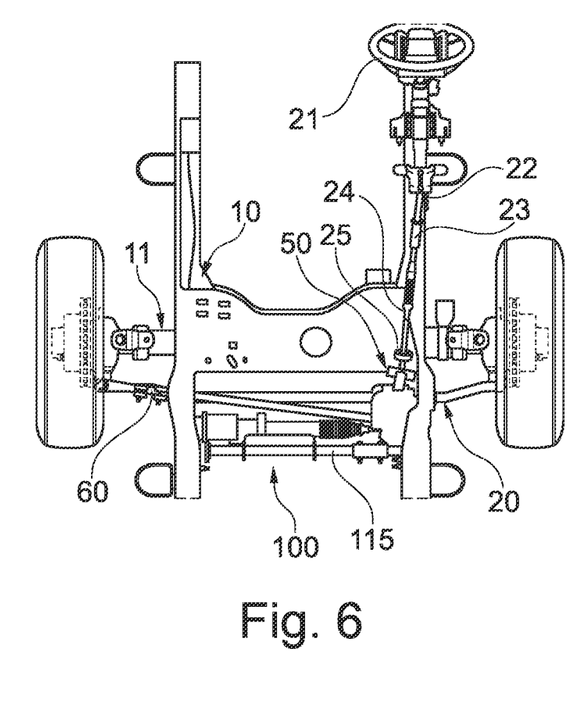
FIG. 6 is a top plan graphic view of the exemplary embodiment of FIG. 1.

In the steering assembly 20 according to the exemplary embodiment, the output member 55 of the mechanism 50 includes an end 56 which may be coupled to a first end 61 of a drag link 60. The drag link 60 further includes a second end 62 which may be coupled to a steering knuckle of the right-hand wheel of the vehicle such that movement of the end 56 of the output member 55 of the mechanism 50 moves the drag link 60 causing the steering knuckle to move the wheel. The steering knuckle of the right-hand wheel of the vehicle of the exemplary embodiment may also be coupled to a first end 71 of a tie rod or crossover or parallel link 70. The tie rod link 70 may include a second end 72 that may be coupled to the steering knuckle of the left-hand wheel of the vehicle such that movement of the steering knuckle of the right-hand wheel may be directly transferred to movement of the left-hand wheel by the tie rod 70 as is understood in the vehicle steering art and is best shown in FIGS. 2 and 3. While the present exemplary embodiment is disclosed as including a drag link steering geometry as part of the steering assembly 20, it should be understood that the exemplary embodiment may also include a Haltenberger or a parallel link steering system or any other steering system that may be usable or appropriate in a vehicle according to the exemplary embodiment.

Figure 7:
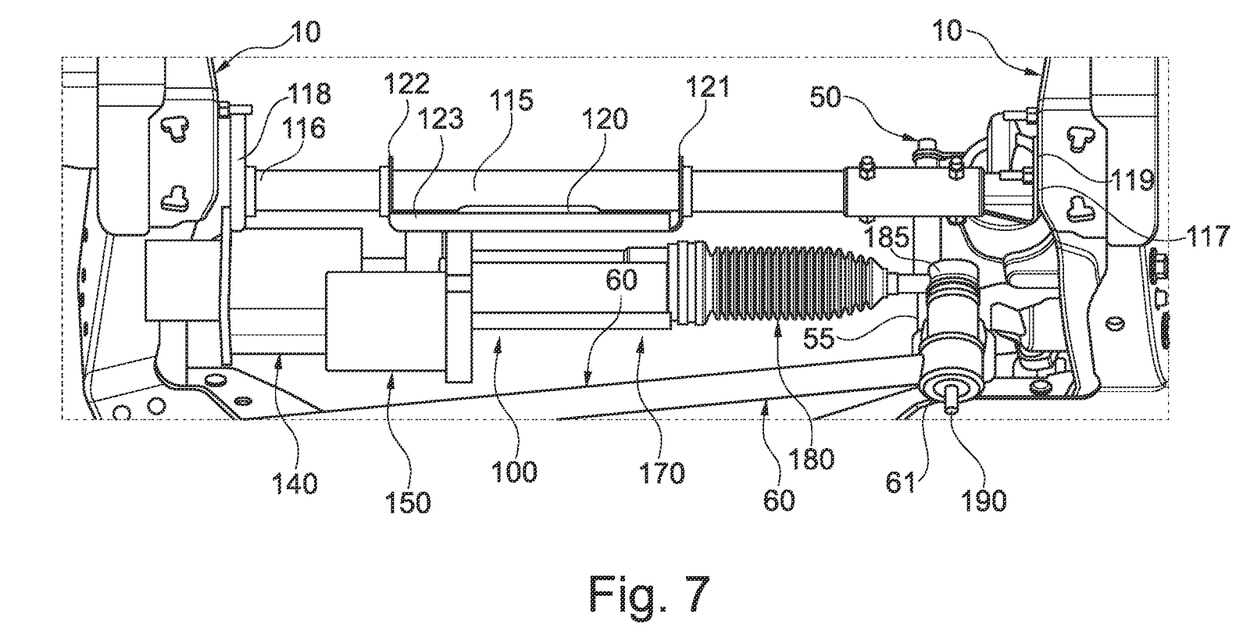
FIG. 7 is a partial, bottom view detailing the mounting of the rack mechanism of the exemplary embodiment of FIG. 1.
Figure 8:
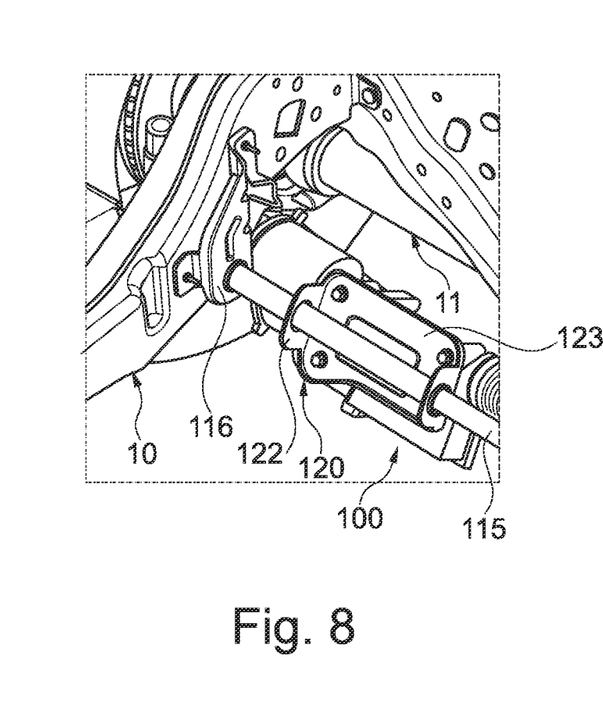
FIG. 8 is a partial, perspective graphic view of the exemplary embodiment of FIG. 7 detailing one end mount of the rack mechanism.
Figure 9:
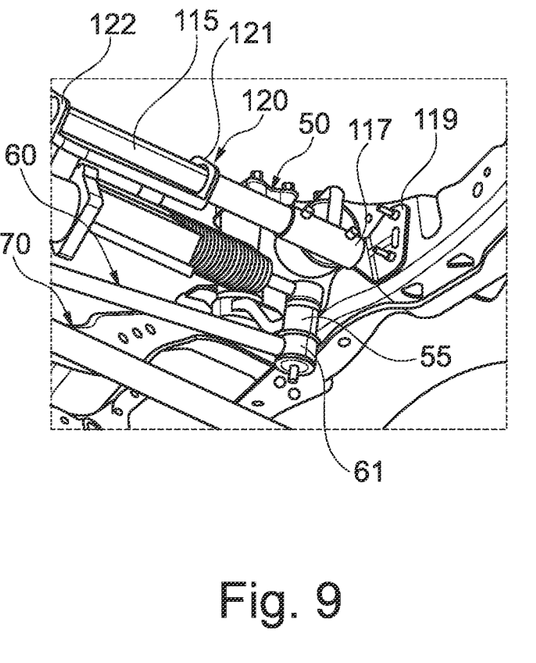
FIG. 9 is a partial, perspective graphic view of the exemplary embodiment of FIG. 7 detailing the other end mount of the rack mechanism.
Figure 10:
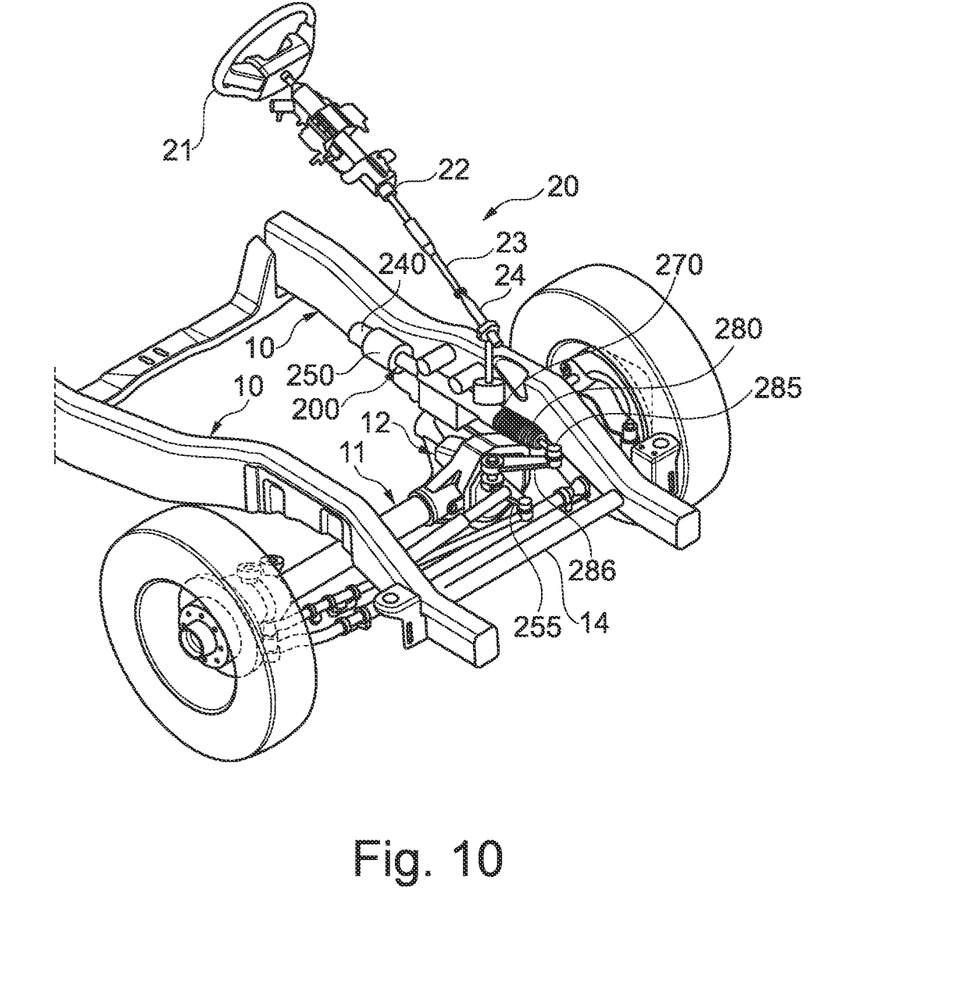
FIG. 10 is a perspective graphic view of a vehicle frame having a solid front axle and including a power assist steering apparatus according to an alternate exemplary embodiment of the present disclosure.
Figure 11:
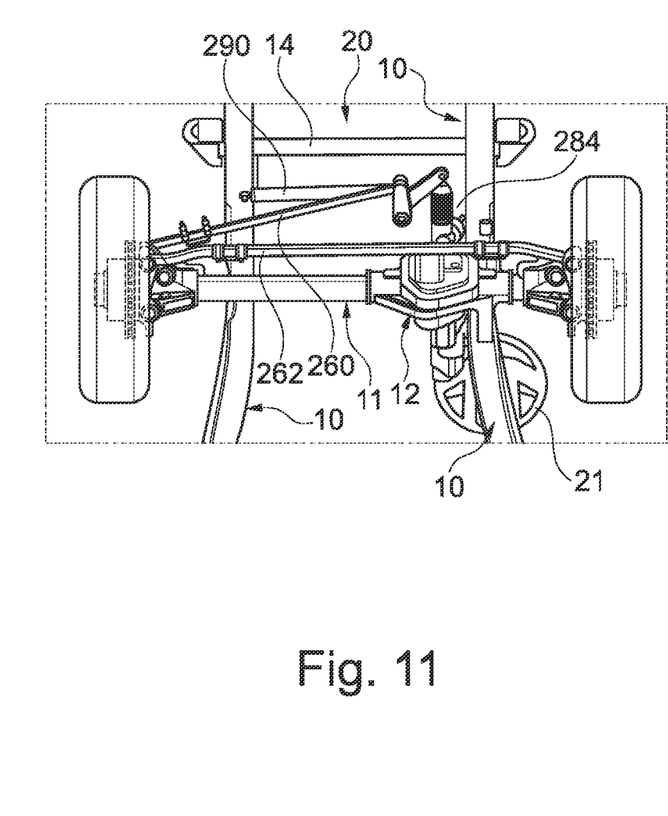
FIG. 11 is an alternate bottom perspective graphic view of the exemplary embodiment of FIG. 10.

The steering assembly 20 according to the exemplary embodiment further includes an electric power assist steering (EPAS) device 100 as best shown in FIGS. 7 through 9. The output of the EPAS device 100 may be provided as an input to the first end 61 of the drag link 60 of the steering assembly 20 for assisting in steering the front wheels of the vehicle having a solid front axle. The EPAS device 100 may generally extend longitudinally and include it in a longitudinal axis. The EPAS device 100 may be coupled to and supported on a crossbeam support or cross member 115 that may extend between the left-hand and right-hand beams of the solid vehicle frame 10 as best shown in FIGS. 1 through 9. The cross number 115 may include a first end 116 coupled to the right-hand frame member and a second end 117 coupled to the left-hand frame member of the vehicle frame 10. The cross member 115 may be a generally tubular member made from an appropriate material (typically similar to that of vehicle frame) sufficient for fixedly supporting the EPAS device 100 longitudinally between the right-hand and left-hand frame members and transferring the forces generated by the EPAS device 100 to the drag link 60 using the vehicle frame 10 as a base. The cross member 115 may have a generally round or circular cross-section and may have any known or appropriate shaped cross-section including square, rectangular, round, elliptical or any other known or appropriate shape and may be tubular or solid.

Referring to FIG. 8, the first end 116 of the cross member 115 may be coupled to the right-hand vehicle frame member using a bracket 118. Referring to FIG. 9, the second end 117 of the cross member 115 may be coupled to the left-hand vehicle frame member using a bracket 119. Referring now to FIG. 7, the EPAS device 100 may be coupled to a bracket 120 that may be coupled directly to the cross member 115. Alternatively, the EPAS device 100 may be directly coupled to the cross member 115 in an embodiment not shown in the figures. The bracket 120 may include a first extension tab 121 located at a first end of the racket 120 and may further include a second extension tab 122 located at a second end of the bracket 120. Each of the first and second extension tabs 121 and 122, respectively, include a passage or hole therein for coupling the bracket member 120 to the cross member 115. The cross member 115 may be located in the holes in the first and second extension tabs 121 and 122, respectively, and may then be coupled, connected or fixed, such as by welding, in any known or appropriate manner. Bracket member 120 may further include a base 123 extending between the first and second extension tabs 121 and 122, respectively. The base 123 preferably may have a generally planar and rectangular shape and may include a plurality of holes for directly coupling the EPAS device 100 to the base 123 using a plurality of fasteners, such as bolts, or any other known or appropriate coupling device or attaching method.

The EPAS device 100, according to the exemplary embodiment, may further include an electric motor 140 having a rotating output that may be coupled to a recirculating ball nut device 150. The recirculating ball nut device 150 may be of a general or appropriate construction and may include a steering gear and rack 170 and a cover or bellows 180 for covering at least a portion of an output or link member 185 of the rack 170 as best shown in FIG. 7. The motor 140 of the EPAS device 100 may be supplied with electrical power from the electrical system of the vehicle. The motor 140 of the EPAS device 100 may preferably be controlled using an appropriate electric controller such as the electrical controller of the steering assembly 20. The motor 140 generates a rotary output that may be coupled to the input of the ball nut device 150.

In the EPAS device 100 according to the exemplary embodiment, the ball nut device 150 may include a gear train for rotating the ball nut within the device 150 and transferring the rotary motion of the ball nut (not shown) to the steering gear for translating or axial movement of the rack 170 and the output end 185 for supplying an additional steering input to the wheels of the vehicle separate from the input to steering wheel 21. The output of the end 185 of the EPAS device 100 may be coupled to the output end 55 of the mechanism 50 and the end 61 of the drag link 60 using any known or appropriate coupling structure. In the exemplary embodiment shown, the end 185 may be coupled to the end 55 and the end 61 using a pin or stud 190 to form a double joint such that the output of the EPAS device 100 may be used to control the steering of the front wheels of the vehicle which are driven using power from the powertrain and supplied to the front wheels through the solid front axle.

The device 150 preferably may further be designed such that back driving of the rack 170 from the operation of the steering assembly 20 through the steering wheel 21 and the mechanism 50 and its output member 55 may have as little resistance from the device 150 as possible. In one exemplary embodiment as disclosed, this may be accomplished by including a one-way driving clutch mechanism within the device 150. Similarly, the mechanism 50 may preferably include a one-way driving clutch mechanism there in such that output of the EPAS device 100 may be used for driving the drag link 60 and the driving assembly 20 and not against resistance forces of the mechanism 50.

As should be apparent from the exemplary embodiment as disclosed, the steering assembly 20 no longer includes a hydraulic assist which has been eliminated from the steering gear mechanism 50 and thereby eliminating the need for a power steering pump which reduces the overall power consumption of the vehicle and thereby improving its efficiency and ultimately it's fuel economy. The EPAS device 100 of the exemplary embodiment may be controlled as desired or necessary to provide steering assist during operation of the vehicle. The ball nut mechanism may be coupled to the output 50 disposed through the ball nut on the axis thereof such that rotation of the ball nut may cause the rack shaft to move axially (or translate) with respect to the housing of the ball nut mechanism 50.

Referring now to the exemplary embodiment disclosed in FIGS. 10 through 15, there is disclosed a steering assembly for a vehicle including an EPAS device 200. Similar to the exemplary embodiment disclosed in FIGS. 1 through 9, the EPAS device 200 includes many carryover components which are labeled the same in the exemplary embodiment of FIGS. 10 through 15. It should be noted that the vehicle frame 10 is of similar cab on frame design for a heavy duty vehicle and includes right-hand and left-hand frame members and cross frame members. Similarly, the heavy duty vehicle of FIGS. 10 through 15 includes a solid or monobeam front axle 11 including the differential 12.

In the present exemplary embodiment, the frame 10 includes a cross member 14 which is moved forward with respect to the front axle 11 providing additional clearance and space proximate the end 24 of the I-shaft 23 for locating the EPAS device 200 along the left-hand rail of the solid frame of the vehicle. In the present exemplary embodiment, the EPAS device 200 may be directly coupled to the left-hand rail of the solid frame of the vehicle or may alternatively be coupled to a bracket that is coupled to the left-hand rail of the frame of the vehicle. While the EPAS device 200 of the present exemplary embodiment is generally operable in a manner similar to the EPAS device 100 of the prior exemplary embodiment, it provides improved optional packaging opportunities and related efficiencies. The opportunity to package the EPAS device 200 longitudinally aligned with the left-hand frame member and the I-shaft 23 (or alternatively with the right-hand frame member in a right-handed driving vehicle) provides additional significant benefits for an EPAS solution for a solid front axle vehicle.

In the present exemplary embodiment, the vehicle may include an EPAS device 200 including a motor 240 having a rotary output coupled to a single-sided rack and pinion EPAS gear device 250 including a rack 270 that may be linearly translated by the gear device 250 in response to the motor 240. Since the present exemplary embodiment no longer requires, but may still optionally include, the mechanism 50, the end 285 of the rack 270 of the EPAS device 200 may be coupled to the end 24 of the I-shaft 23 may be coupled to a first end 231 of a lower steering linkage 230 which may have its other end coupled to a gearbox 235 integrated with the steering gear of the rack 270 of the device 250 to directly drive the rack 270 to translate to engage the steering linkage of the steering assembly 20 and steer the wheels of the vehicle in response to an input applied to the steering wheel 21. In the exemplary embodiment where the mechanism 50 remains coupled to the I-shaft 23, the mechanism 50 will be a non-assist type recirculating ball nut gear (i.e., a manual drive).

In the present exemplary embodiment shown, the I-shaft 23 is directly coupled to the EPAS device 200 which reduces or minimizes the amount of lash within the steering assembly 20 to provide improved steering compliance when a steering input is applied to the steering wheel 21. Additionally, while the present exemplary embodiments show the EPAS devices 100 and 200, having a longitudinal axis located either perpendicular or aligned with the axis (or plane) of the I-shaft 23, it should be understood that it may be possible to adjust the longitudinal axis of the EPAS devices 100 and 200, respectively to be located at any angle with respect to the longitudinal axis of the I-shaft 23 as may be desired for the packaging of the steering assembly 20 in a vehicle according to the present disclosure.

Figure 12:
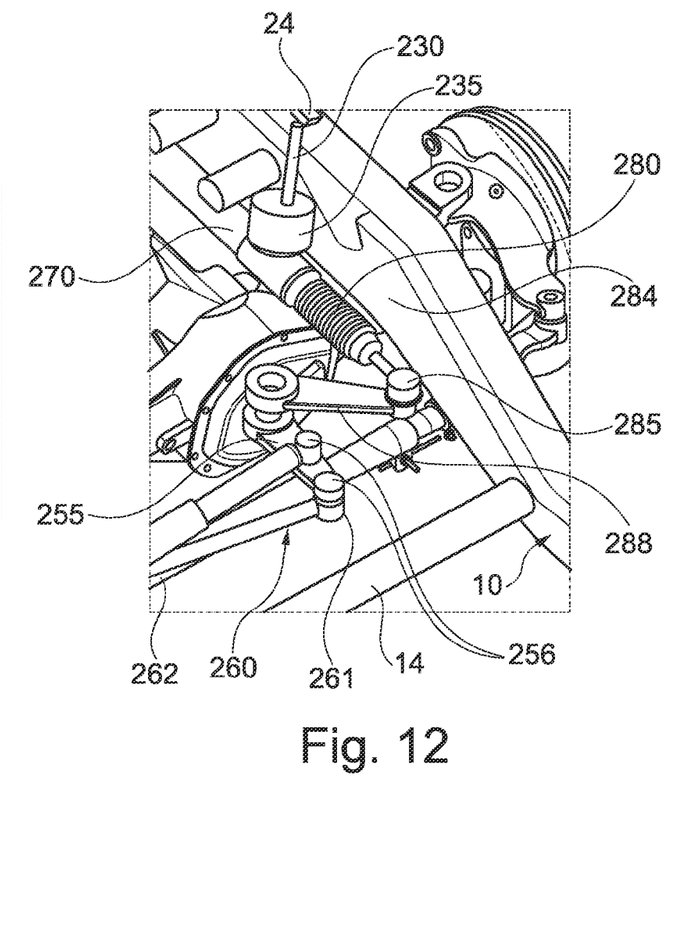
FIG. 12 is a partial, perspective graphic view of the exemplary embodiment of FIG. 10.
Figure 13:
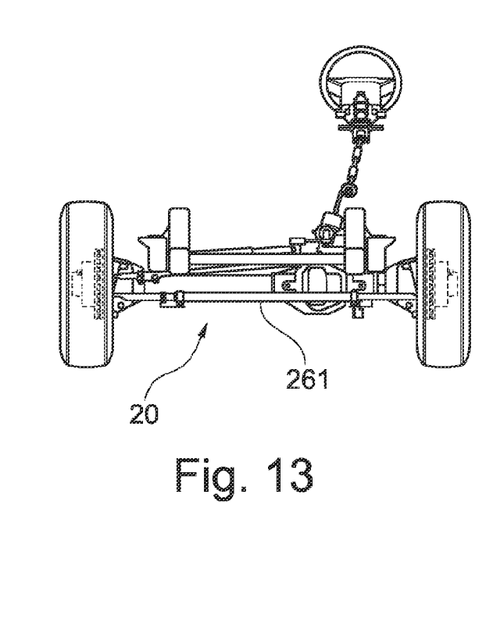
FIG. 13 is a front plan graphic view of the exemplary embodiment of FIG. 10.
Figure 14:
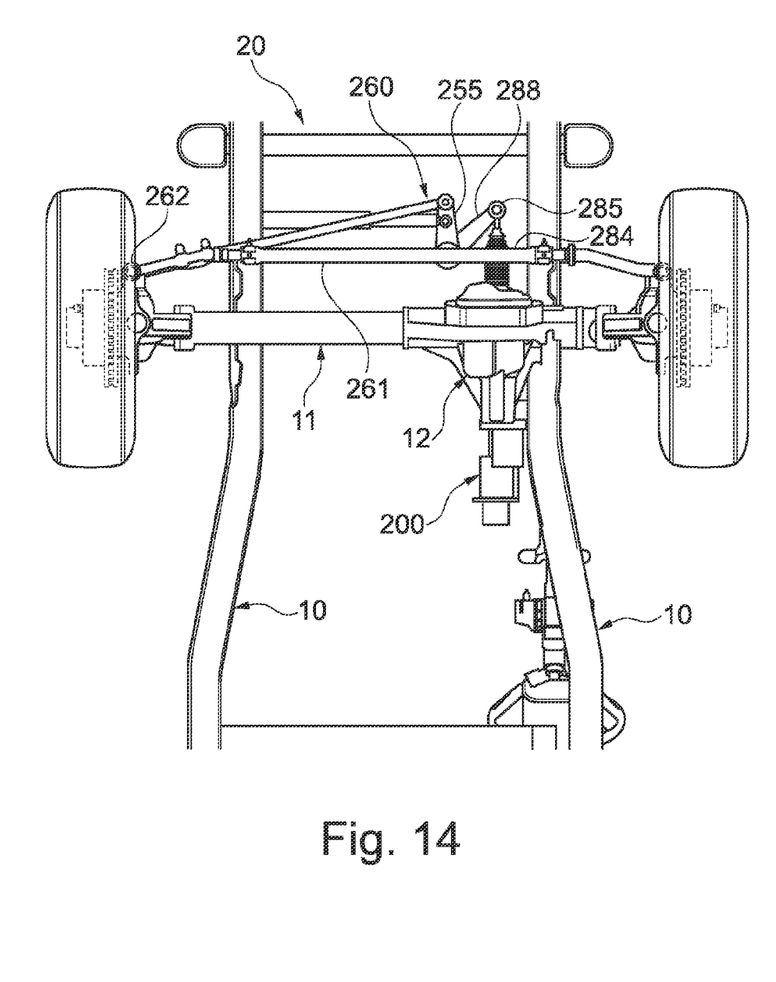
FIG. 14 is a bottom plan graphic view of the exemplary embodiment of FIG. 10.
Figure 15:
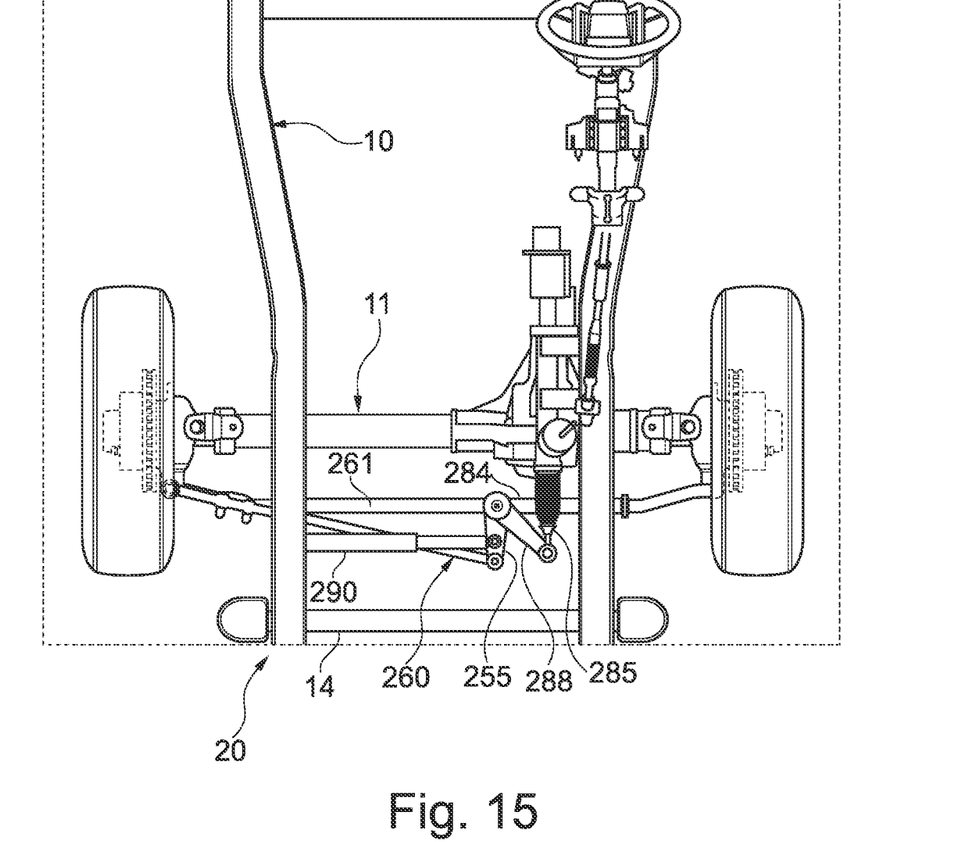
FIG. 15 is a top plan graphic view of the exemplary embodiment of FIG. 10.

In the present exemplary embodiment of FIGS. 10-15, the steering linkage of the steering assembly 20 may include the output link member or pitman arm 255 having a first end coupled to the base member 284 of the frame 10 and a second or output end 256. Similar to the prior exemplary embodiment, the end 256 of the link member 255 may be coupled to an end 261 of a drag link 260. To utilize the existing steering linkage members of the steering assembly 20, a lever 288 may be coupled at one end to the end 285 of the rack member 270 and may be coupled at a second and to the first end of the link member 255 and supported there with on the base 284 so that rotation of the lever 288 caused by movement of the end 285 of the rack 270 may be directly transferred to cause rotation of the link member 255 and thereby may cause movement of the drag link 260 to cause the wheels of the vehicle to turn. As best shown in FIG. 12, the ends of the lever 288 and the link member 255 share a common pivot supported by the base 284 and it may be coupled there with using any known or appropriate device such as a fastener or stud. A second end 262 of the drag link 260 may be coupled to a steering knuckle on the end of the solid front axle similar to the prior exemplary embodiment and as is understood in the art.

The steering assembly 20 of the present embodiment may further include a steering link member 290 having a first and coupled near the middle of the lever member 255 and a second end coupled to the right-hand frame member 10. The steering link member 290 includes a pair of telescoping link members and provides stability to the steering assembly 20 during operation. The steering assembly 20 of the present exemplary embodiment may further include a parallel or tie rod or link member 267 having a first end coupled to the knuckle member proximal the second end 262 of the drag link 260 and a second and coupled to the knuckle member of the left-hand wheel.

In operation, the steering assembly 20 of the present exemplary embodiment may be operated by an in input applied a rotational force to the steering wheel 21 which is transmitted to rotate the I-shaft 23 which transmits the rotational force to the lower steering linkage 230 which provides an input to the steering gear of the rack and pinion device 250 thereby translating the rack 270, the end 285 of which rotates the lever 288 and output member 255 about the base 284 providing an input to the drag link 260 and thereby steering the wheels of the vehicle. Rotation of the steering wheel 21 in an opposite direction is similarly translated to cause the rack member 270 to move in an opposite direction and to thereby cause the drag link 260 to move in opposite direction and to also move the link member 267 and thereby steer the wheels of the vehicle in an opposite direction.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless expressly stated, all ranges are intended to include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The use of the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

The disclosure of "a" or "one" to describe an element, ingredient, component or step is not intended to foreclose additional elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps.

It is understood that the present description is intended to be illustrative and not restrictive. Many embodiments as well as many applications besides the examples provided will be apparent to those of skill in the art upon understanding the present disclosure. The scope of the claimed invention should, therefore, not be determined with limiting reference to the description, but should instead be determined with reference to the appended claims, along with the full scope of equivalents to which such claims are entitled. Any disclosure of an article or reference, including patent applications and publications, is incorporated by reference herein for all purposes. Any omission in the following claims of any aspect of subject matter disclosed herein is not a disclaimer of such subject matter.

What is claimed is:

1. An electric power assist steering (EPAS) system for a wheeled vehicle having a solid front axle and a steering assembly including a drag link having an end for receiving an input and an end for coupling to a tie rod for steering the wheels of the vehicle, the EPAS system comprising
    a. a motor having a rotary output;
    b. a steering gear coupled to the motor for receiving the rotary output of the motor;
    c. a steering rack having a longitudinal extent and defining an axis; the steering rack coupled to the steering gear and being translated in a direction aligned with the axis of the steering rack in response to rotation of the steering gear, the steering gear having an output end for coupling to the end of the drag link;
    d. an assembly having an output member for coupling to the end of the drag link for independently operating the steering of the vehicle;
    e. a cross member having a first end for coupling to a first side of a vehicle frame and a second end for coupling to a second side of the vehicle frame, the cross member for coupling the EPAS system to the vehicle frame; and
    f. a bracket having a first extension member having a hole for receiving the cross member and a second extension member for receiving the cross member and a generally planar member extending between the first and second extension members for coupling the EPAS system to the cross member.

2. The electric power assist steering system of claim 1 wherein the steering rack is designed to be aligned in a direction perpendicular to the longitudinal direction of the vehicle.

3. The electric power assist steering system of claim 1 wherein the steering rack is designed to be aligned parallel with the longitudinal direction of the vehicle and further comprising a lower steering linkage having a first end for coupling to a steering shaft and a second end for coupling to the steering gear.

4. The electric power assist steering system of claim 3 wherein the steering assembly further comprises a pivotable lever having a first end for coupling to the output end of the rack and a second end for coupling to the end of the tie rod.

5. An electric power assist steering (EPAS) system for a vehicle having a solid front axle and a steering assembly including an rotatable I-shaft having an end coupled to a recirculating ball nut mechanism having an output for driving a drag link having an end for steering the wheels and for receiving an input from the EPAS system, the EPAS system comprising:
    a. a motor having a rotary output;
    b. a steering gear coupled to the motor for receiving the rotary output of the motor;
    c. a steering rack having a longitudinal extent and defining an axis; the steering rack coupled to the steering gear and being translated in a direction aligned with the steering rack in response to rotation of the steering gear, the steering gear having an output end for coupling to the end of the drag link for independently operating the steering of the vehicle;
    d. a cross member having a first end for coupling to a first side of a vehicle frame and a second end for coupling to a second side of the vehicle frame, the cross member for coupling the EPAS system to the vehicle frame; and
    e. a bracket having a first extension member having a hole for receiving the cross member and a second extension member for receiving the cross member and a generally planar member extending between the first and second extension members for coupling the EPAS system to the cross member.

6. The electric power assist steering system of claim 5 wherein the steering rack is designed to be aligned in a direction perpendicular to the longitudinal direction of the vehicle.

7. The electric power assist steering system of claim 5 wherein the steering rack is designed to be aligned in a direction parallel to the longitudinal direction of the vehicle.

8. The electric power assist steering system of claim 5 wherein the steering rack is designed to be located between a position in which the axis is aligned in a direction perpendicular to the longitudinal direction of the vehicle and a direction aligned in a direction parallel to the longitudinal direction of the vehicle.

9. The electric power assist steering system of claim 5 wherein the recirculating ball nut mechanism of the steering assembly further comprises a motor having an output that is responsive to the rotation of the I-shaft for steering the vehicle independent of the EPAS system.

* * * * *